July 15, 1958  R. E. RISLEY ET AL  2,843,155
PIPE REPAIR CLAMP

Filed March 29, 1955  6 Sheets-Sheet 1

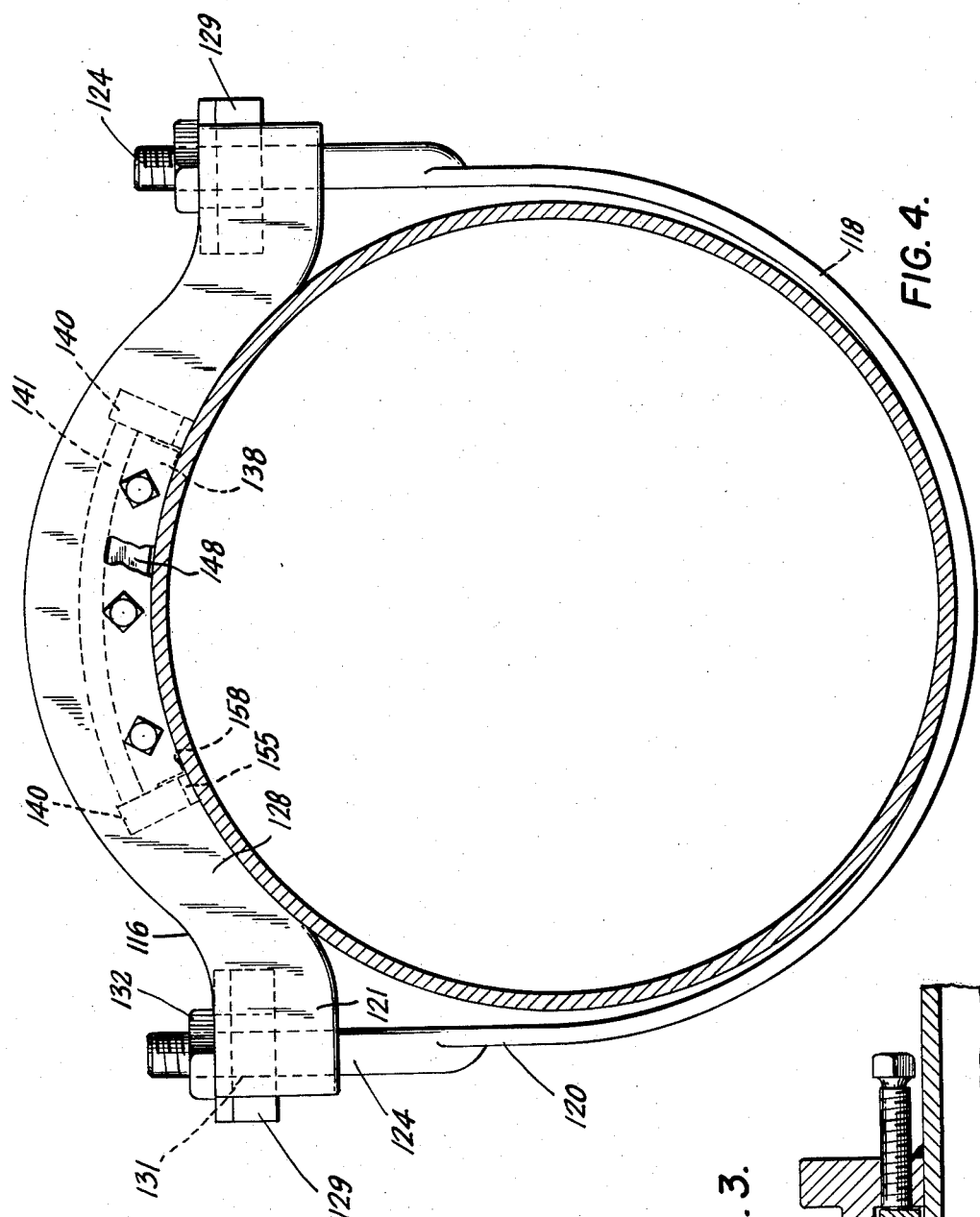
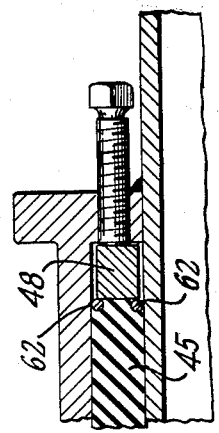

July 15, 1958 R. E. RISLEY ET AL 2,843,155
PIPE REPAIR CLAMP
Filed March 29, 1955 6 Sheets-Sheet 3
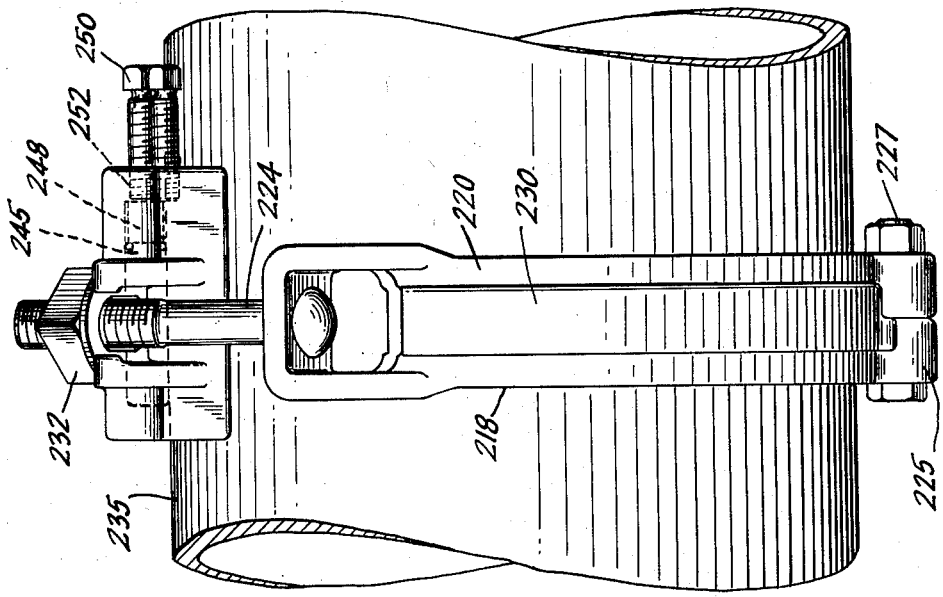
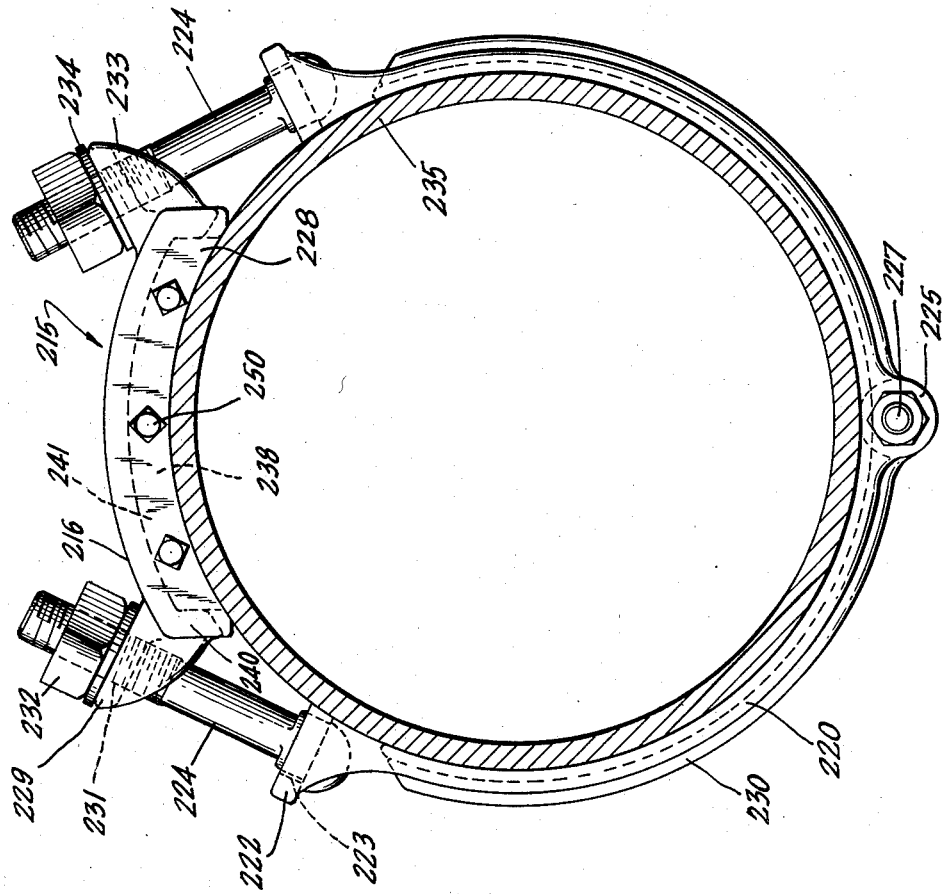

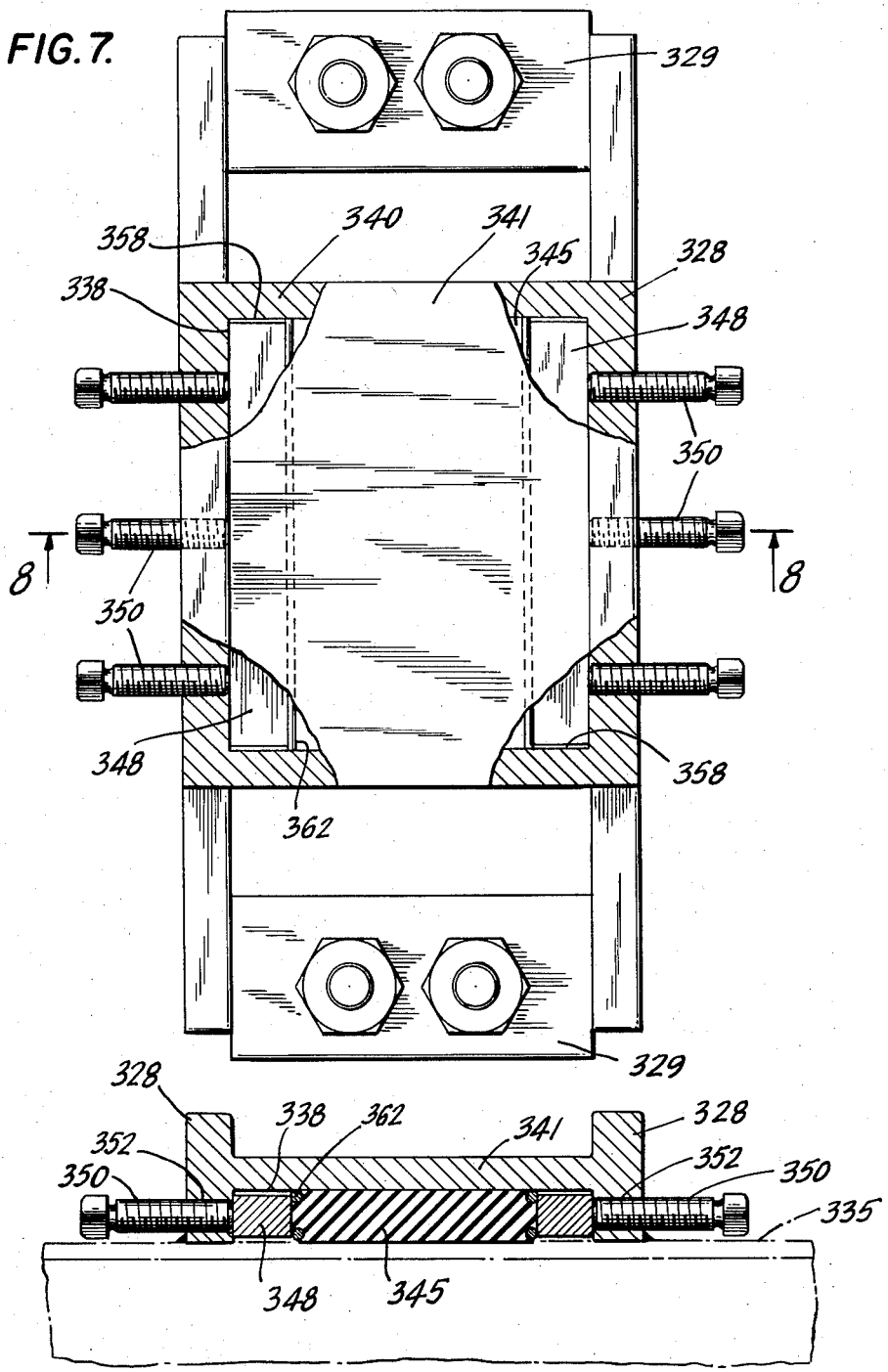

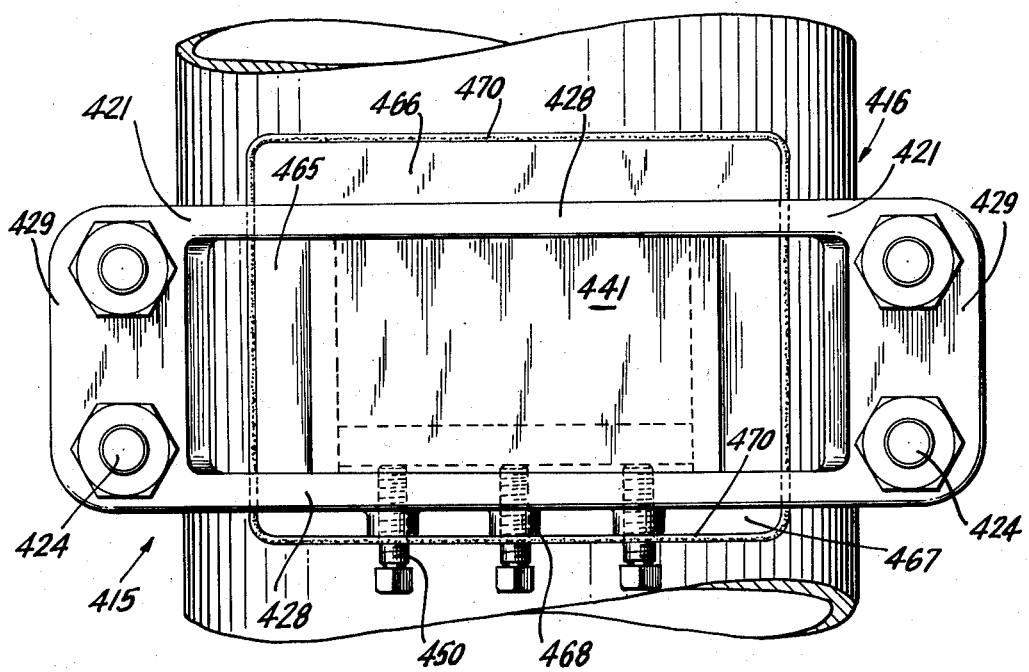
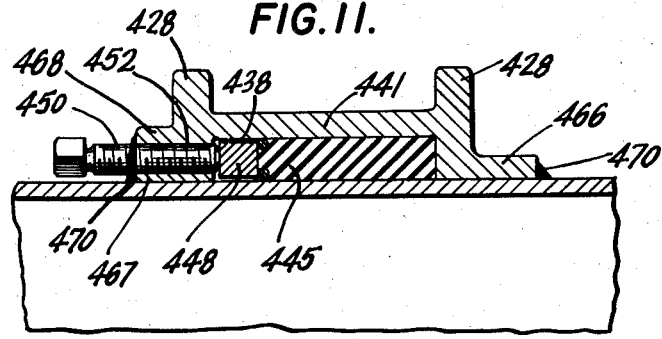

United States Patent Office 2,843,155
Patented July 15, 1958

2,843,155

PIPE REPAIR CLAMP

Roger E. Risley and Howard L. Hoke, Bradford, Pa., assignors to Dresser Industries, Inc., Dallas, Tex., a corporation of Texas Application March 29, 1955, Serial No. 497,617

10 Claims. (Cl. 138—99)

This invention relates to a pipe fitting and is more particularly concerned with a leak repair clamp for application to a pipe to effect emergency repair of leaks in the pipe. More specifically the invention relates to a leak repair clamp of the character indicated which has an improved structure and which is particularly adapted for use on pipes carrying fluids under high pressure.

In the maintenance of pipe lines, e. g. local lines for the transmission of gas, water, steam, or the like, or long-distance lines for the transmission of oil, water and gas, leaks caused by cracks or punctures in the pipe are repaired, at least temporarily, by the application to the pipe of a leak repair clamp. A leak repair clamp comprises essentially a body portion having a leak sealing gasket means for application over the damaged section of the pipe and a clamping portion for drawing the body portion against the pipe to compress the gasket into fluid-sealing relationship.

Various types of repair clamps of this character have been proposed and used and while these clamps have been relatively effective in service, they have, for the most part, been of a construction which is suitable for sealing leaks in ordinary pipe lines and the like but which is unsuited for use on pipe lines carrying high pressure fluids. In the field of gas and steam transmission, extremely high pressures are frequently employed and the problem of effectively sealing leaks which develop as a result of the failure of the pipe walls is a serious one. Because of the high pressures, even so-called "pinhole" openings in the pipe, which may result from corrosion or mechanical damage, are of a serious nature and must be effectively sealed. Conventional leak repair clamps do not effectively solve this problem.

In conventional pipe leak repair clamps, the drawing together of the clamp body portion and the clamping means effects the necessary compression of the packing and pressure on the packing can only be changed by tightening the entire clamp on the pipe. This is, however, not always feasible and due to irregularities in the surface of the pipe the desired pressure can not always be obtained. Moreover, excessive pressures on the pipe which may result from too forceful tightening of the clamp may damage the pipe or the clamp, or both. This presents a major problem in the repair of pipe lines carrying high pressure fluids since high packing pressures are necessary.

Moreover, many of the repair clamps known in the art have for the most part involved a construction which is not adapted to be packed and shipped as an integral unit ready for direct application to the pipe, and have included a gasket portion which can easily become separated from the clamp body portion and thus cause delays in application of the clamp. These heretofore known types of leak repair clamps have generally required preparatory assembly and have required relatively skilled labor for proper installation. In view of the fact that it is particularly desirable to close a pipe leak as promptly as possible, since the escape of gas or liquid is not only wasteful but sometimes hazardous, it is highly advantageous to have available an efficient clamp which is assembled and shipped as an integral unit ready for direct application and which can be installed rapidly and easily.

It is an object of the present invention to provide an improved leak repair clamp for pipes which is effective in sealing leaks in the pipes even when high pressure fluids are present.

It is another object of the invention to provide an improved leak repair clamp for pipes in which the several component parts are assembled in self-sustaining relationship and which is adapted to be transported and stored as an integral unit, ready for direct installation without need for preparatory assembly of the component parts.

It is a further object of the invention to provide a leak repair clamp of the character indicated which is of an improved construction.

It is another object of the invention to provide an improved pipe repair clamp including means for controlling and varying the sealing pressure applied to the pipe.

In accordance with the invention there is provided a pipe line leak repair clamp which comprises a main body portion which is adapted to be centered over the leak and is provided with an integral interior recess for receiving a packing gasket, clamping means which are adapted to cooperate with the main body portion for securing the body portion to the pipe in firm, pressure-resistant relationship, a gasket constructed to be received in the recess formed in the body portion, and means for applying lateral pressure to the gasket to force it under pressure into contact with the pipe surface being sealed and with the walls of the recess in the clamp body portion in which it is confined. In a preferred embodiment of the invention, there are provided pressure applying means for the gasket which exert adjustable pressure upon two sides of the gasket, and lateral confining means are provided for the sides of the gasket receiving the pressure applied by the pressure applying means.

It is a feature of the invention that the clamp is effective to stop leakage in the pipe even when the fluid in the pipe is at high pressures and that pressure on the sealing gasket can be readily adjusted and varied to suit specific existing conditions.

It is another feature of the invention that the repair clamp permits high pressure to be applied to the gasket without subjecting the pipe wall as a whole to excessive pressures.

It is a further feature of the invention that the pipe repair clamp can be installed rapidly and effectively even by unskilled labor.

Other objects and features of the invention will be readily apparent from the following detailed description of illustrative embodiments thereof and from the accompanying drawings wherein, Fig. 1 is an end elevational view of a pipe repair clamp embodying features of the present invention, the clamp being shown in position on a pipe;

Fig. 3 is a fragmentary view of the embodiment shown in Figs. 1 and 2 illustrating the use of means for preventing gasket extrusion;

Fig. 4 is an end elevational view of another embodiment of the invention showing a modified relationship of clamp body to clamp securing means;

Fig. 5 is a similar view of a further embodiment of the invention showing another modification of the relationship of the clamp body to the clamp securing means;

Fig. 6 is a side elevational view of the structure shown in Fig. 5;

Fig. 7 is a top plan view of another pipe repair clamp embodying features of the present invention, the clamp being partly broken away to show structural details;

Fig. 8 is a sectional view of the clamp shown in Fig. 7, the view being taken approximately along the line 8—8 of Fig. 7;

Fig. 11 is a further sectional view of the clamp taken approximately along the line 11—11 of Fig. 9; and Fig. 12 is a plan view of the clamp of Figs. 9 to 11 in installed position on the pipe with the welding completed.

Figure 2:
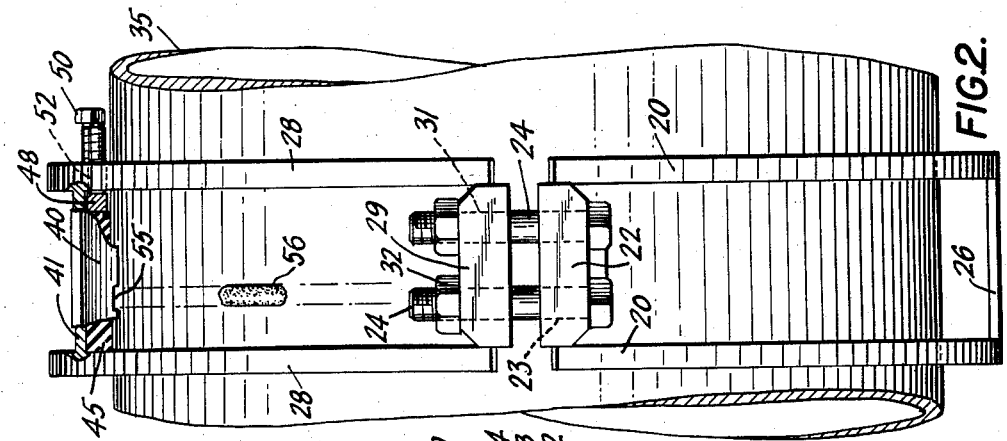
Fig. 2 is a side elevational view of the repair clamp shown in Fig. 1, the body portion of the clamp being partly broken away to show details of structure.
Figure 1:
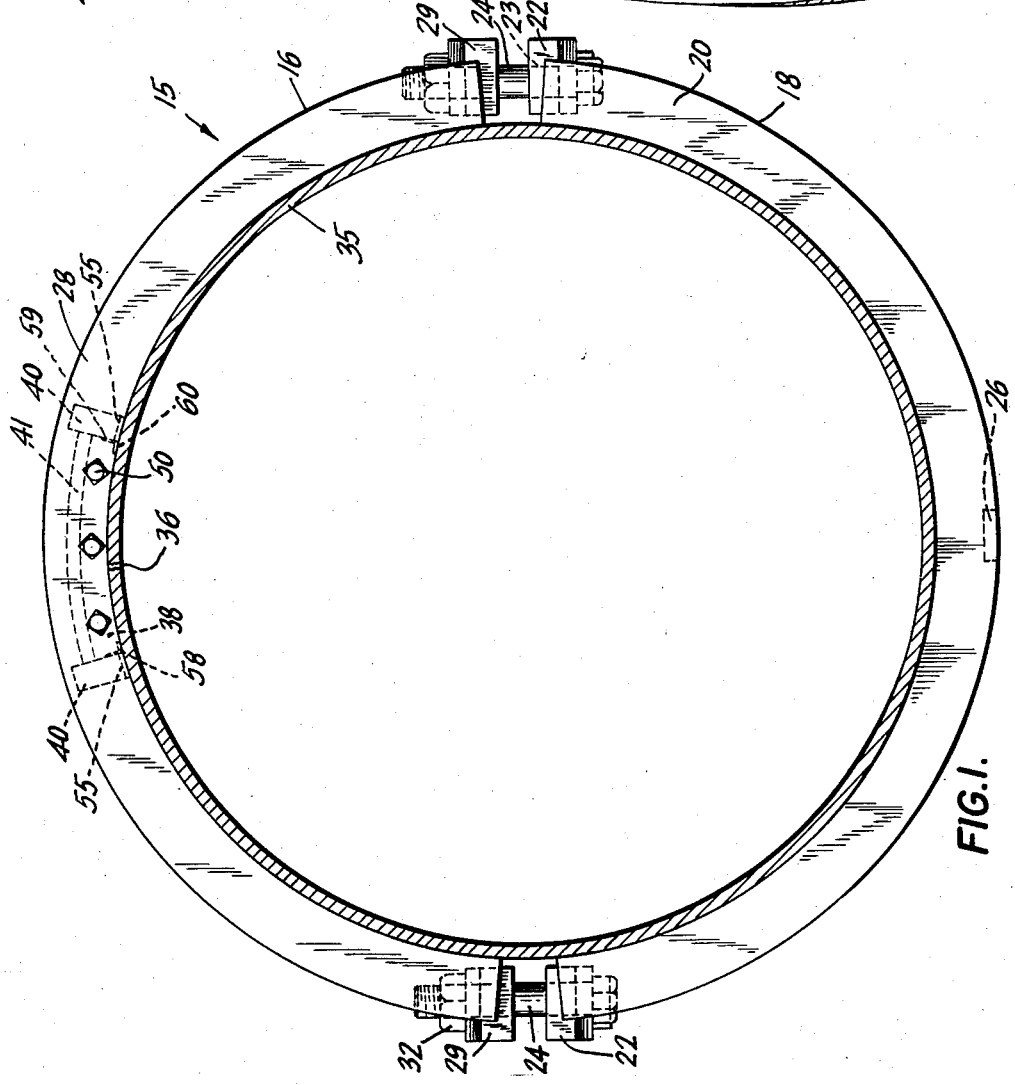

Referring to the drawings, and more particularly to Figs. 1 and 2, the reference numeral 15 designates generally the clamp illustrated which is formed from a body portion 16 and a clamping or securing portion 18 which is adapted to draw the body portion firmly against the pipe being repaired. The clamping portion 18 is formed from two axially spaced-apart substantially semi-circular end members 20 interconnected at their ends by side bars 22 secured in any convenient manner, as by welding, to the end members 20. Side bars 22 are formed with apertures 23 for the reception of bolts 24 for drawing together the body portion 16 and the clamping portion 18. A reinforcing bar 26 midway between side bars 22 maintains end members 20 in the desired spaced-apart relationship between the side bars. Body portion 16 is similarly formed by two axially spaced-apart semi-circular end members 28 connected at their ends to side bars 29 which are provided with apertures 31 for reception of the other ends of bolts 24. As shown in Figs. 1 and 2, the clamping portion and the body portion of clamp 15 are adapted to be firmly positioned by means of the bolts 24 and the associated nuts 32 around the leaking portion of the pipe, e. g. the pipe 35, the central portion of the body portion 16 being placed over the break 36 through which the fluid is escaping from the pipe.

As shown in Figs. 1 and 2, the central portion of body portion 16 is formed with a gasket recess 38 which is defined between end members 28 by side walls 40 and a cover wall 41 which closes the space between end members 28 and side walls 40. As will be seen in Fig. 1, the cover wall 41 has substantially the same curvature as the end members 28 which corresponds, of course, to the curvature of the pipe 35, so that the gasket recess 38 is described by arcs of two concentric circles and the radii at the ends of the arcs. While the shape of the gasket recess 38 may be varied, if desired, advantageously the cover wall 41 has the concentric curvature above referred to, although the side walls 40 need not lie on radii and may, for example, be parallel to the vertical axis of the pipe passing through the central portion of the body portion of the clamp.

Adapted to be received in the gasket recess 38 is a gasket pad 45. Gasket pad 45 is formed from rubber or rubber composition, this term being used generically to include natural and synthetic rubbers, e. g. butadiene-styrene co-polymer known as GR–S, and other elastomeric compounds or compositions having like properties and characteristics. The material is relatively firm and solid but sufficiently resilient and elastic to flow under pressure to conform to the surfaces between which it is confined. Preferably, the gasket pad 45 is formed from a rubbery composition which is relatively resistant to attack by hydrocarbon gases and oils. Examples of such resistant rubbery compositions suitable for use with the leak repair clamp are Neoprene (polychloroprene) and butadiene-acrylonitrile co-polymers, such as those known commercially by the trade designations Buna–N or GR–A.

The invention is, however, not limited to these specific materials, and particularly when special resistance to gases and oils is not required, any rubbery composition having the above-noted characteristics may be employed.

Fluid-tight sealing of the break 36 is achieved by imposing compressive forces upon the gasket pad while it is confined in the gasket recess 38 so that the pad will press firmly upon the surface of the pipe adjacent the break and will be partly forced into the break itself. For this purpose there is provided a compressing member or "follower" 48 which is dimensioned to fit in the gasket recess and has a radial dimension corresponding approximately to that of the gasket recess 38, sufficient clearance being provided that the follower will slide axially in the recess. As will be seen in Fig. 2, the axial dimension of the follower 48 is relatively small compared with the axial dimension of the gasket recess 38, e. g. 15%, and the gasket pad 45 is dimensioned to cooperate with the follower to fill the gasket recess. Pressure is applied to the gasket pad by urging the follower 48 axially toward the pad and for this purpose there are provided follower bolts or set screws 50 threadedly engaged in apertures 52 formed in one of the end members 28. At least two follower bolts or set screws 50 are provided to act upon the ends of the follower 48 and advantageously at least one intermediate bolt is employed, as shown in Fig. 1.

When the clamp 15 is to be assembled around the pipe to be repaired, the gasket pad 45 and the follower 48 are first positioned in the gasket recess 38 and the screws 50 tightened sufficiently to hold the parts in place before the body portion 16 is positioned with its central portion over the break. Indeed, the gasket pad and follower may be assembled with the body portion at the time of manufacture and the complete assembly shipped and stored as such for rapid installation. Engagement with the clamping portion 18 by means of the bolts 24 is then effected to secure the clamp firmly around the pipe. To seal and stop the leak the follower screws 50 are then gradually turned in the threaded apertures 52 to force the follower 48 against the gasket pad 45. Since the gasket pad 45 is wholly confined in the gasket recess 38 by the cover wall 41 and the side walls 40, the compressive forces exerted upon the gasket pad by the follower 48 when acted upon by the screws 50 are transmitted as radial forces toward the surface of the pipe. As a result, the rubbery material of the gasket pad is firmly pressed under high pressure against the break and the adjacent portions of the pipe.

In the case of pipe lines which are formed from pipe sections interconnected by welding, the break in the pipe may occur at or near the weld. In order that the clamp 15 may be readily used for repairing and sealing such breaks, the side walls 40 are conveniently provided with aligned recesses 55 which will accommodate the weld (indicated at 56 in Fig. 2). As seen in Fig. 2, the recesses 55 are positioned so that the pipe weld will be near the axial center of the gasket pad 45 after pressure has been applied to the pad by follower 48. For some uses, particularly in the case of clamps for the smaller sizes of pipes where the recess 55 may not be readily visible, the center line of the compressed gasket and recess may be indicated by an arrow or other external indicia.

When, however, the clamp is not used adjacent a weld, it is necessary to close the recesses 55 to prevent possible extrusion of the gasket pad 45. For this purpose there are advantageously employed liner strips 58 of L-shaped cross-section having a radial leg 59 which lies against the adjacent side wall 40 and an axial leg 60 which underlies the follower 48. Liner strips 58 effectively confine the edges of the gasket pad 45 without in any way interfering with the application and transmission of compressive forces.

When very high pressures will be encountered, it is advisable to provide the gasket pad with means for insuring against gasket extrusion around the radially-inner edges of follower 48 and end member 28. Any convenient means may be provided for this purpose but the arrangement shown in Fig. 3 has been found to be particularly effective for this purpose. As shown in Fig. 3, expansible metallic rings 62 are provided at the two radially-inner, axially-spaced-apart edges of the gasket pad. The expansible rings 62 are preferably combined with the gasket pad 45 in a singular unitary structure and are advantageously in the form of an annular helix which is molded into the rubber composition of the gasket pad by known molding means. The rings 62 are flexible and can, therefore, conform exactly to the curvature of the gasket pad as it is accommodated in the gasket recess. When the gasket pad is compressed by the action of the follower 48, the expansible rings 62 are forced between the pipe surface and the adjacent surfaces of the follower and of the end member 28 and thus effectively close any gaps which may exist in these areas to prevent extrusion of the rubber material of the gasket.

It will be understood that the structure and inter relationships of the body portion and the clamping portion of the repair clamp may be varied greatly without departing from the invention and without decreasing from the effectiveness of the clamp. Referring, for example, to Fig. 4, wherein parts corresponding to those shown in Figs. 1 and 2 are given like reference numerals to which 100 has been added, the body portion 116 is formed from end members 128 shaped in the manner of a yoke and having outwardly directed ends 121 between which the side bars 129 are secured. The clamping portion 118 is in the form of a U and comprises a flexible U-shaped band 120 having circular ends 124 which are threaded and are received in the single central aperture 131 in each side bar 129 for engagement with the nuts 132. While only a single clamping portion 118 is shown in Fig. 4, the body portion 116 may be constructed to receive two axially-spaced clamping portions of the construction shown. For this purpose the side bars 129 are formed with two apertures 131 as shown in Fig. 2. The embodiment of Fig. 4 is particularly suitable for pipes of relatively small diameter e. g. 4 in. to 12 in., whereas the more massive construction of Figs. 1 and 2 is intended for larger pipe. The construction of the gasket recess 138 and the associated parts of the central portion of body portion 116 is identical with the corresponding portion of the embodiment of Figs. 1 and 2. Thus, shown in Fig. 4 are side walls 140, cover wall 141, follower 148 which presses against the gasket pad (not shown), and liner strips 158 for covering recesses 155.

Another illustrative embodiment of the clamp of the invention adapted for use with small and medium size pipe is shown in Figs. 5 and 6 wherein parts corresponding to those shown in Figs. 1 and 2 are given like reference numerals to which 200 has been added. In the clamp 215 illustrated, the body portion has been abbreviated and the end members 228 extend only between the side walls 240. As shown, the side walls 240 are parallel to the vertical axis of the clamp and the cover wall 241 merges with the side walls and the end members to define the enclosed gasket recess 238. One of the end members 228 is provided with threaded apertures 252 for reception of the set scews 250 which urge the follower 248 against the gasket pad 245. The operation of the body portion to seal a break in the pipe 235 is the same as in the previously-described embodiments. The clamping portion 218, however, is formed from two hingedly interconnected arcuate arms 220 of identical construction. The arms 220 have apertured complementary end lugs 225 connected by a bolt 227. A rib 230 reinforces each arm and end lugs 222 are formed at the end of each arm 220 for reception of the bolts 225 in apertures 223. The bolts 224 are connected to body portion 216 by means of wings 229 which extend from the ends of cover wall 241 and are formed with apertures 231 which are in the form of slots so that the bolts can be slipped into them laterally. The wings 229 include reinforcing ribs 233 which merge with the adjacent side walls 240. The bolts are tightened by means of nuts 232 rotatable on washers 234. It will be noted that the wings 229 are centered with respect to the portion of the gasket recess 238 occupied by the compressed gasket pad 245 so that the clamping action takes place on the portion of the body portion which is subjected to the greatest pressure and therefore has the greatest tendency to lift off the pipe. If desired, the body portion 216 may be provided with two or more wings on each side and a clamping portion provided for each additional wing.

It will be further understood that instead of the single follower shown in Figs. 1 to 6, a pair of followers, one on each axial side of the gasket pad, may be used. Thus, as shown in Figs. 7 and 8, wherein parts correspond to those shown in the embodiment of Figs. 4 are given like reference numerals to which 300 has been added, the gasket recess 338, which is defined by end members 328, side walls 340 and cover wall 341, accommodates two followers 348 and the gasket pad 345 is dimensioned to occupy the space between the followers. Both of the end members 328 are provided with threaded bolt apertures 352 and set screws 350, which are engaged in these apertures press axially against both of the followers. As in the construction shown in Fig. 3, the gasket pad is provided with expansible rings 362 to guard against possible extrusion between the followers 348 and the surface of the pipe 335, and liner strips 358 similarly prevent lateral extrusion. Side bars 329 at the ends of the end members 328 provide means for connecting the body portion and clamping portion as in Fig. 4.

Figure 9:
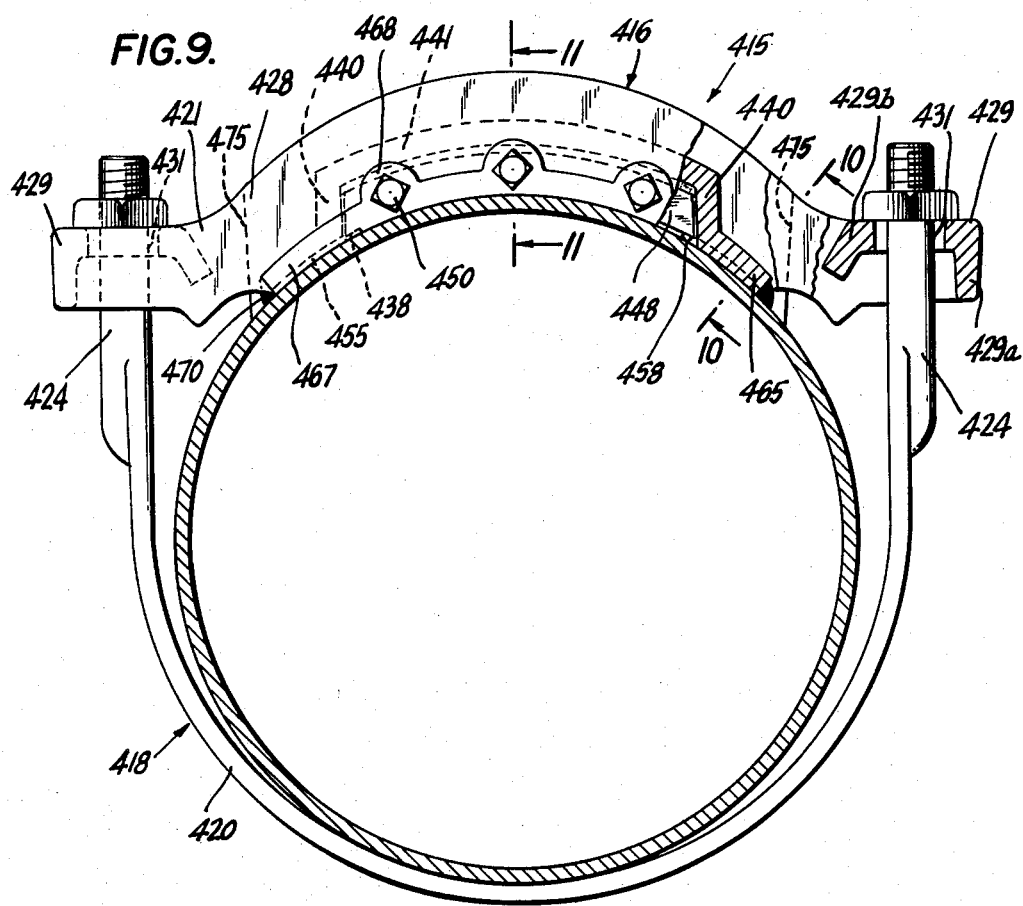
Fig. 9 is an end elevational view, partly in section, of an embodiment of the invention particularly adapted for welded application.
Figure 10:
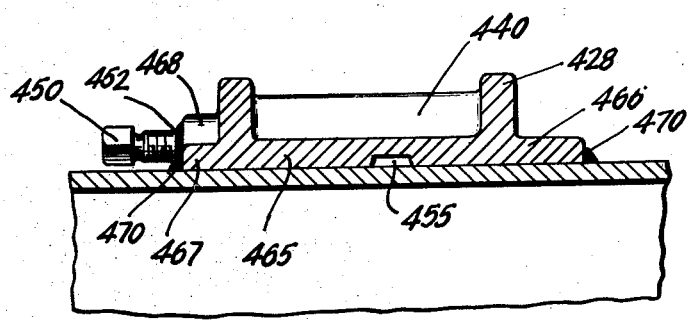
Fig. 10 is a sectional view taken approximately along the line 10—10 of Fig. 9.

In some installations it is desirable that the clamping portions be used only for temporarily holding the body portion of the clamp in position and that the body portion be welded to the pipe. Thus, after the clamp is installed in the usual manner as above described, and the desired pressure applied to the gasket, the body portion is welded on all sides to the pipe and the clamping portion removed. An embodiment of the clamp of the invention which is particularly suitable for welded application and which permits a large portion of the total clamp to be removed after the welding operation has been completed, is illustrated in Figs. 9 to 12. In these figures, wherein parts corresponding to those shown in Figs. 1 to 3 have been given like reference numerals to which 400 has has been added, the clamp illustrated is designated generally by the reference numeral 415. Clamp 415 is formed formed from two axially spaced-apart end members 428 having outwardly-directed ends 421 which are interconnected by side bars 429 having outer flanges 429a and inner flanges 429b. As in the embodiment of Fig. 4, the flanges 429 are provided with apertures 431 through which are received the ends 424 of the U-shaped bands 420 making up the clamping portion 418. Centrally the body portion 416 has two circumferentially spaced-apart axial side walls 440 parallel to the vertical axis of the clamp and interconnected by means of cover wall 441. Side walls 440 and cover wall 441 join with the adjacent portions of the end members 428 to define the gasket recess 438 in which is received gasket pad 445 and follower 448. One of the end members 428 is formed with threaded apertures 452 for reception of set screws 450 for engagement with follower 448. Merging with the lower edges of side walls 440 and having a curvature corresponding to that of the lower edges of end members 428 are flanges 465. A flange 466 extends between and forms a continuation of flanges 465 and merges with the lower edge of the end member 428 on the side of the body portion opposite the bolts 450 and the follower 448. A similar but axially shorter flange 467 extends between flanges 465 and merges with the lower edge of the end member 428. Adjacent the apertures 452, the end member 428 is formed with bosses 468 which extend axially outwardly with flange 467 and merge with the latter. The bosses and the adjoining portions of flange 467 are suitably tapped to provide extensions of apertures 452 for set screws 450. Flanges 465 are advantageously provided with aligned but eccentric recesses 455 which serve the same purpose as the recesses 55 of the embodiment of Fig. 1 and 2. To prevent possible extrusion of the gasket material when the clamp is not positioned over a weld, there are suitably employed liner strips 458 having their legs formed to correspond to the angle between the side walls 440 and the surface of the pipe, as indicated in Fig. 9.

To install clamp 415 upon a pipe to repair a leak, the body portion 416, with gasket pad 445 and follower 448 in place, is positioned over the damaged portion with the situs of the leak substantially under the center of the gasket pad. The nuts on the clamping portion are then tightened to draw the body portion firmly in place and then the set screws 450 are turned to create the desired gasket pressure. The body portion 416 is then welded to the pipe by applying the weld 470 as indicated in Fig. 12 viz. along flanges 465, 466 and 467. The clamping portion can then be removed and the body portion will remain in position on the pipe. To reduce the bulk of the body portion to a minimum, which may be desirable in some installations, the end members 428 are suitably cut as indicated in dotted lines 475 in Fig. 9 to remove the end portions 421. The welding is then suitably completed by joining the welds around the cut-off edges of the end members 428 and, preferably, the portions of the set screws 450 extending beyond flange 467 and bosses 468 are cut off and the remaining portions welded in their respective apertures by extending the weld 470, as shown in Fig. 11.

By reason of the presence of the flanges 465, 466 and 467, and the follower 448, the welds 470 are sufficiently spaced from the gasket pad 445 that the heat from the welding operation does not damage the gasket. Consequently, the welding of the body portion to the pipe has no adverse effect upon the installation and gasket pressure remains at its full value, and a neat, permanent installation is effected.

There is thus provided, in accordance with the invention, a pipe leak repair clamp which is effective in sealing leaks even when high-pressure fluids are present and which permits high gasket pressures to be applied in safety and without distortion or other damage to the clamp. It will also be seen that the gasket and the follower or followers can be mounted in the body portion before installation so that the clamp can be stored or transported in self-sustaining relationship ready for instant installation. One of the important advantages of the repair clamp of the invention is the fact that it can be installed as a mechanical clamp and can then be welded to the pipe at a later date. In the case of pipe lines carrying oil or other combustible fluids welding at the time the clamp is initially applied may be extremely dangerous. Consequently, conventional welded patches and the like cannot be safely used. The repair clamp of this invention, however, makes it possible to provide a welded installation with complete safety.

While the invention has thus been illustrated and described with reference to certain preferred embodiments thereof, it will be obvious that various changes and modifications in addition to those above mentioned may be made without departing from the scope of the invention as defined in the appended claims. It will further be understood that, insofar as they are not mutually incompatible, the various features and details of construction of the several embodiments shown and described are interchangeable with one another. It is intended, therefore, that all matter contained in the foregoing description and in the drawings shall be interpreted as illustrative only and not as limitative of the invention.

What we claim and desire to secure by Letters Patent is:

1. A leak repair clamp for application to a pipe to effect emergency repair of leaks therein comprising, in combination, a body portion and a clamping portion removably connected therewith for drawing the body portion into firm engagement with the surface of the pipe, said body portion including a pair of axially spaced-apart arcuate end members and means cooperating with said end members to define a confined gasket recess, said last-named means including a pair of circumferentially spaced-apart side members extending between said end members, and a cover member, gasket means seated in said recess, follower means in said recess adjacent said gasket means in coplanar relationship therewith for applying pressure to said gasket means transversely of the surface of the pipe, and means for urging said follower means against said gasket means, said last-named means including a plurality of pressure members actuatable outside said gasket recess to apply pressure to said follower means in the direction of said gasket means.

2. A leak repair clamp for application to a pipe to effect emergency repair of leaks therein comprising, in combination, a body portion and a clamping portion removably connected therewith for drawing the body portion into firm engagement with the surface of the pipe, said body portion including a pair of axially spaced-apart arcuate end members and means including a cover member cooperating with said end members to define a confined gasket recess, one of said end members being provided with circumferentially spaced-apart threaded apertures communicating with said recess, gasket means seated in said recess, follower means in said recess between said gasket means and the apertured end member for applying pressure to said gasket means transversely of the surface of the pipe, and means for urging said follower means against said gasket means, said last-named means being actuatable outside said gasket recess and comprising a plurality of set screws threadedly receivable in the apertures in the end member to apply pressure to said follower means in the direction of said gasket means.

3. A leak repair clamp for application to a pipe to effect emergency repair of leaks therein comprising, in combination, a body portion and a clamping portion removably connected therewith for drawing the body portion into firm engagement with the surface of the pipe, said body portion including a pair of axially spaced-apart arcuate end members and means cooperating with said end members to define a confined gasket recess, said last-named means including a pair of circumferentially spaced-apart side members extending between said end members, and a cover member, gasket means seated in said recess, follower means in said recess adjacent said gasket means in coplanar relationship therewith for applying pressure to said gasket means transversely of the surface of the pipe, and means for urging said follower means against said gasket means, said last-named means including a plurality of pressure members actuatable outside said gasket recess to apply pressure to said follower means in the direction of said gasket means, said side members being provided with aligned eccentric recesses in their radially-inner edges.

4. A leak repair clamp for application to a pipe to effect emergency repair of leaks therein comprising, in combination, a body portion and a clamping portion removably connected therewith for drawing the body portion into firm engagement with the surface of the pipe, said body portion including a pair of axially spaced-apart arcuate end members and means including a cover member cooperating with said end members to define a confined gasket recess, basket means seated in said recess, follower means in said recess adjacent said gasket means in coplanar relationhip therewith for applying pressure to said gasket means transversely of the surface of the pipe, means for urging said follower means against said gasket means, said last-named means including a plurality of pressure members actuatable outside said gasket recess to apply pressure to said follower means in the direction of said gasket means, and liner strips confining the radially inner edges of said gasket means between said end members in said gasket recess.

5. A leak repair clamp for application to a pipe to effect emergency repair of leaks therein comprising, in combination, a body portion and a clamping portion removably connected therewith for drawing the body portion into firm engagement with the surface of the pipe, said body portion including a pair of axially spaced-apart arcuate end members and means cooperating with said end members to define a confined gasket recess, said last-named means including a pair of circumferentially spaced-apart side members extending between said end members, and a cover member, said end members being provided with circumferentially spaced-apart threaded apertures communicating with said recess, gasket means seated in said recess, follower means in said recess adjacent said gasket means in co-planar relationship therewith for applying pressure to said gasket means transversely of the surface of the pipe, said follower means comprising a follower member on each axial side of said gasket means, and means for urging said follower means against said gasket means, said last-named means being actuatable outside said gasket recess and comprising a plurality of set screws threadedly receivable in the apertures in the end members to apply pressure to said follower means in the direction of said gasket means.

6. A leak repair clamp for application to a pipe to effect emergency repair of leaks therein comprising, in combination, a body portion and a clamping portion removably connected therewith for drawing the body portion into firm engagement with the surface of the pipe, said body portion including a pair of axially spaced-apart arcuate end members and means cooperating with said end members to define a confined gasket recess, said last-named means including a pair of circumferentially spaced-apart side members extending between said end members, and a cover member, gasket means seated in said recess, follower means in said recess adjacent said gasket means in co-planar relationship therewith for applying pressure to said gasket means transversely of the surface of the pipe, and means for urging said follower means against said gasket means, said last-named means including a plurality of pressure members actuatable outside said gasket recess to apply pressure to said follower means in the direction of said gasket means, and said gasket means being provided with reinforcing means on the radially inner edges thereof adjacent said follower means and adjacent the end member opposite said follower means.

7. In a pipe line having a damaged area permitting escape of fluid from the interior of said line, an externally-applied leak repair clamp covering said damaged portion and stopping said leak, said clamp comprising, in combination, a body portion and a clamping portion removably connected therewith and drawing the body portion into firm engagement with the surface of the pipe, said body portion having means defining a confined gasket recess therein, said body portion including a pair of axially spaced-apart arcuate end members and one of said end members being provided with circumferentially spaced-apart threaded apertures communicating with said recess, gasket means seated in said recess, said gasket means covering the damaged area of the pipe, follower means in said recess between said gasket means and the apertured end member applying pressure to said gasket means transversely of the surface of the pipe to force the gasket means into firm sealing engagement with said damaged area, and means continuously urging said follower means against said gasket means, said last-named means being actuatable outside said gasket recess and comprising a plurality of set screws threadedly receivable in the apertures in the end member to apply pressure to said follower means in the direction of said gasket means.

8. In a pipe line having a damaged area permitting escape of fluid from the interior of said line, an externally-applied leak repair clamp covering said damaged portion and stopping said leak, said clamp comprising, in combination, a body portion and a clamping portion removably connected therewith and drawing the body portion into firm engagement with the surface of the pipe, said body portion having means defining a confined gasket recess therein, said last-named means including a pair of axially spaced-apart arcuate end members and a pair of circumferentially spaced-apart side members extending between said end members, and a cover member, gasket means seated in said recess, said gasket means covering the damaged area of the pipe, follower means in said recess adjacent said gasket means in co-planar relationship therewith applying pressure to said gasket means transversely of the surface of the pipe to force the gasket means into firm sealing engagement with said damaged area, means continuously urging said follower means against said gasket means, said last-named means including a plurality of pressure members actuatable outside said gasket recess to apply pressure to said follower means in the direction of said gasket means, and liner strips confining the radially inner edges of said gasket means between said end members in said gasket recess.

9. In a pipe line having a damaged area permitting escape of fluid from the interior of said line, an externally-applied leak repair clamp covering said damaged portion and stopping said leak, said clamp comprising, in combination, a body portion and a clamping portion removably connected therewith and drawing the body portion into firm engagement with the surface of the pipe, said body portion having means defining a confined gasket recess therein, said last-named means including a pair of axially spaced-apart arcuate end members and a pair of circumferentially spaced-apart side members extending between said end members, and a cover member, gasket means seated in said recess, said gasket means covering the damaged area of the pipe, follower means in said recess adjacent one side of said gasket in co-planar relationship therewith, means applying pressure to said gasket means transversely of the surface of the pipe to force the gasket means into firm sealing engagement with said damaged area, and means continuously urging said follower means against said gasket means, said last-named means including a plurality of pressure members actuatable outside said gasket recess to apply pressure to said follower means in the direction of said gasket means, said side members being formed with circumferentially-extending flanges merging with their radially inner edges and the end member on the side of said gasket member opposite said follower means having an axial flange merging with its radially inner edge, the outer edges of all of said flanges being welded to said pipe line.

10. In a welded pipe line having a damaged area adjacent a weld line permitting escape of fluid from the interior of said line, an externally-applied leak repair clamp covering said damaged portion and stopping said leak, said clamp comprising, in combination, a body portion and a clamping portion removably connected therewith and drawing the body portion into firm engagement with the surface of the pipe, said body portion having means defining a confined gasket recess therein, said last-named means including a pair of axially spaced-apart arcuate end members and a pair of circumferentially spaced-apart side members extending between said end members, and a cover member, gasket means seated in said recess, said gasket means covering the damaged area of the pipe, follower means in said recess adjacent said gasket means in co-planar relationship therewith applying pressure to said gasket means transversely of the surface of the pipe to force the gasket means into firm sealing engagement with said damaged area, and means continuously urging said follower means against said gasket means, said last-named means including a plurality of pressure members actuatable outside said gasket recess to apply pressure to said follower means in the direction of said gasket means, said side members being provided with aligned eccentric recesses in their radially inner edges receiving said weld line.

References Cited in the file of this patent

UNITED STATES PATENTS

| | | |
|---|---|---|
| 2,188,302 | Pfefferle | Jan. 30, 1940 |
| 2,197,450 | Curtis | Apr. 16, 1940 |
| 2,199,552 | Watson | May 7, 1940 |